United States Patent [19]  [11] 3,787,874
Urban  [45] Jan. 22, 1974

[54] METHOD FOR MAKING BOUNDARY-LAYER FLOW CONDITIONS VISIBLE

[75] Inventor: Gerd Urban, Erlangen, Germany

[73] Assignee: Siemens Aktiengesellschaft, Munich, Germany

[22] Filed: July 7, 1972

[21] Appl. No.: 269,822

[30] Foreign Application Priority Data
July 7, 1971 Germany............................ 2133865

[52] U.S. Cl. ................. 346/1, 23/232 R, 73/432 R, 116/117 R, 137/804, 346/107, 346/135
[51] Int. Cl. ............................................. G01d 5/42
[58] Field of Search ...... 346/1, 107, 135; 73/432 R, 73/147, 168; 23/232 R; 116/117 R; 239/1, 71, 74

[56] References Cited
UNITED STATES PATENTS
1,460,083 6/1923 Thomson ............................ 178/88
2,627,600 2/1953 Rines ............................. 346/74 R X
3,357,024 12/1967 Webb ..................................... 346/1

Primary Examiner—Joseph W. Hartary
Attorney, Agent, or Firm—Hugh A. Chapin

[57] ABSTRACT

Boundary-layer flow conditions of gases are made visible by applying to the surface of a moving or stationary structural body to be exposed to the flow a reactive layer of at least one chemical color indicator, such as an acid-base indicator and/or a Redox indicator or a liquid-crystal indicator, such as a cholesterinic liquid. Then the body is exposed to a flow of gas, such as air, which gas may contain a reagent. The chemical color indicator can also be applied together with gelling means and a moisture binder. The chemical color indicator can also be absorbed by a high-contrast, absorbent paper which is then applied to the body. A metal or plastic foil coated with a binder and/or indicator can also be used for this purpose. A boundary-layer flow pattern image is produced, which can subsequently be recorded by known means.

23 Claims, 10 Drawing Figures

METHOD FOR MAKING BOUNDARY-LAYER FLOW CONDITIONS VISIBLE

BACKGROUND OF THE INVENTION

1. Field of the Invention

This invention relates to a method for making boundary-layer gas flow conditions visible. More particularly, it relates to a method for producing an image of the laminar and/or turbulent gas flow pattern about a structural body by color reactions with chemical indicator systems.

2. Description of the Prior Art

In measuring flow, the known aerodynamic measurement methods which furnish data on velocity, direction and pressure require probes of a mechanical, pneumatic, electrical or magnetic nature with which measuring and indicating instruments are associated. These known methods have the disadvantage that for representing a three-dimensional flow field, a very large number of measurements must be performed with defined space coordinates. Even if the investigation is confined to the field of the boundary layer flow, a substantial effort is still necessary. For recording flow patterns in rotating equipment, probe methods are technically not suited. The same is true regarding the optical methods which use interference, schlieren or shadow effects.

For these reasons, means have been utilized for some time to make flow visible, which are simpler to use and furnish instantaneous images of the flow pattern as well as contour patterns. For gas flow, for example, the filament, dust and flake methods, as well as smoke and liquid-mist methods, have been used. These methods are described in the book by W. Wuest, Stroemungsmesstechnik, Friedr. Vieweg, Braunschweig (1969), p. 151 to 159. Similar methods are applicable to the flow of liquids.

By means of the flow filament method and the dust-precipitation methods, it is possible to make visible the flow separation and the transition point, i.e., the transition from laminar to turbulent flow. The determination of the transition point is important because turbulent flow creates a substantially higher friction resistance than laminar flow. The filament method shows up the transition point by the flutter. In boundary layers, it can also be recognized by the difference in rapid evaporation of liquids or solids placed there.

These known measurement methods cannot be applied in practice to rotating equipment because they are either far too expensive to use, or are technically not suitable for methods such as the probe method. Stroboscopic methods with plastic particles introduced into the air stream, and other known means for making flow visible have also been found unsuitable for displaying the flow in vacuum cleaner blowers and fans for cars. Thus, in summary, none of these known methods are satisfactory.

SUMMARY OF THE INVENTION

The present invention provides a method for making boundary-layer flow conditions of gases visible, by applying at least one chemical color indicator in a thin reactive layer to the surface of a structural body which is to be exposed to the gas flow and then subjecting the structural body to the gas flow for the purpose of producing a visible boundary-layer flow image. The boundary-layer flow image may be recorded, after it has been made visible, by photographing the image in color. In the alternative, the chemical color indicator may be applied to the structural body by first binding it to a smooth absorbent paper and then applying the paper to the structural body, in cases where the structural body has smooth surfaces and a simple shape. After the structural body has been subjected to the gas flow and after the chemical color image of the boundary layer of the boundary-layer flow has been produced on the paper, the paper is stripped off the structural body; this paper provides a record of the flow.

The chemical color indicator to be applied to the structural body may be an acid-base indicator or a Redox indicator or a liquid-crystal indicator. If an acid-base indicator is used, a buffer may be applied to the acid-base indicator prior to applying the indicator to the structural body. The buffer to be mixed with the acid-base indicator may be an alkaline buffer or an acid buffer.

If a liquid-crystal indicator is used, the liquid-crystal indicator may be applied by spraying it on a low-boiling solvent, so that the solvent evaporates leaving a film on the structural body. The liquid-crystal indicator may be a cholesterinic liquid.

A reagent may be added to the gas flow prior to subjecting the structural body to the gas flow for the purpose of facilitating the color reaction of the reactive layer of the chemical color indicator on the structural body. The reagent may be added to the gas flow by conducting the gas flow over the gaseous reagent or by bubbling the gas flow through an aqueous solution of the reagent.

The chemical color indicator may also be applied in a moisture-retaining additive or in combination with a gelling agent and a moisture retainer.

This method may also include the additional step of applying a foil to the structural body prior to subjecting the body to the gas flow, in cases where the body has a plane surface. It may be a metal foil or a plastic foil and may be coated with a binding agent.

DETAILED DESCRIPTION

Figure 1:
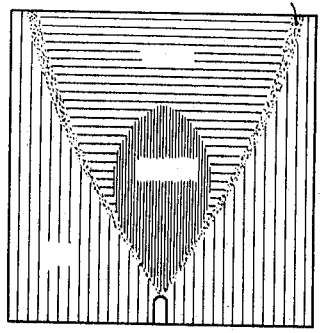
FIG. 1 is a boundary-layer flow image produced by the method disclosed in Example 1.

It has been found that boundary-layer flow of gases can be made visible in moving and stationary structural bodies in a simple manner by color reactions with chemical indicator systems. According to the method of this invention, at least one acid-base indicator and/or at least one Redox indicator or a liquid-crystal indicator, particularly a mixture of cholesterinic liquid crystals, is applied as a thin layer for this purpose to the surface of a moving or stationary structural body prior to being exposed to the flow. The structural body is then subjected to the gas flow, particularly to air flow, which may be mixed with a reagent. The boundary-layer flow image thus produced may be subsequently recorded or developed by known methods.

In the practice of the method according to this invention, differences in the gas flow affect the adjoining surfaces, and they become visible as color changes. The chemical color indicator systems, i.e., the reaction layer and the reagent contained in the flowing gas, should be sensitive and respond rapidly. For this reason, ion reactions between the reagent and the reactive layer are advantageous.

With the method of this invention, the intensity and direction of the boundary layer flow can be made visible by feeding the reagent directly in with the gas flow. The flow corresponding to the instantaneous state can be made visible dynamically. In this manner one can obtain quickly an overview of the flow conditions if they are changed by a different velocity or mechanical adjustment. Furthermore, the transition points can be made visible. The progression of the coloring with the exposure gives information regarding the flow direction and the difference in rapid color deepening gives information regarding the relative flow velocity. In turbulent boundary-layers, sharply outlined, intensely colored spots are produced before the other areas are colored.

By means of chemical or physical-chemical bonding of the pure reagents required for the color change, one obtains excellent adhesion, which withstands even high centrifugal forces. For example, sorption on anodized (eloxadized) aluminum is particularly suitable. Although such a reactive layer of the chemical color indicator is extremely thin and provides sharply drawn contours, its color intensity is only barely adequate, for the same reason. With other materials it was found advantageous to bind the indicators by means of moisture-retaining additives such as gelatine or agar-agar, or by highly viscous hygroscopic solvents. The reactive layer should be free of air bubbles, and be 0.05 to 0.5 mm thick. The thinner the layer with the same area density, the sharper will be the outlines of the flow pattern image. On the other hand, the greater the sensitivity for the chemical reagent, the more the binding agent remains moist, as the material transfer from the flowing medium into the reactive layer is accelerated by its solubility. A combination of gelling and moisture-binding agents, such as glycerin, glycol and glycol ether, yields smoother, highly adhesive reactive layers, which also absorb the reagent readily and are particularly suited for rotating structural parts.

The flow patterns are delineated most clearly by the direct color change of the surface areas in contact with the flow. Particularly well suited are a colorless, transparent background and a white to light, opaque body. On all dark materials, the color contrast must be sufficiently enhanced.

The indicator preparations used in accordance with this invention can readily be washed off from the surface of the test body exposed to the flow and be replaced by another layer. In the case of smooth surfaces of simple shape, the reactive layer can also be applied in a form in which it is bound to smooth absorbing paper, which at the same time acts as a high-contrast background. After the chemical recording of the paper image, the "chemigram," is stripped off. "Chemigraphy" means the effect of the reagent on the reactive layer. In most cases color photography is used for documenting the chemigram.

According to one embodiment of the invention, structural bodies with a plane, developable surface are provided with cemented-on coated metal or plastic foil. In the reactive layers prepared with binder, no segregation of the indicators occurs. In the case of liquid-crystal reactive layers, this is achieved by spraying them on in a low-boiling solvent so thinly that the solvent evaporates immediately leaving a dry film on the body. A sprayed-on gelatine sol mixture results in a slightly grained surface with a stipple effect in the flow pattern image. However, the image of the boundary-layer flow pattern proper is not impaired thereby.

The display of the flow around experimental profiles turns out very well on glass plates coated with a reactive layer. If a suitable fluoride is used as a buffer with an acid reagent, an etched pattern is produced on the glass, which becomes visible after the reactive layer is removed.

The chemical reagents of the indicator system are gases or such vapors which have a saturation vapor pressure at the operating temperature which is at least sufficient for the indication. In most cases, the operating temperature is room temperature. The chemical reagents can be added in gaseous form to the flowing medium from pressure bottles. In other cases it is sufficient to charge the gas or air stream by conducting it over, or bubbling it through, an aqueous solution of the reagent.

The generally homogeneous admixture of a chemical reagent can be achieved, for instance, by introducing it ahead of a mixing blower, or by inserting a section of tubing for the mixing.

For liquid-crystal layers, operation in a closed circuit is recommended, in order to keep the concentration of the reagent completely constant through regulation. The required partial pressure is several hundred Torr. In addition to depending upon the specific reagent, the magnitude of the approrpriate partial pressure also depends upon the composition of the liquid crystal and on how high above room temperature their range of thermographic indication is. A separation of about 10°C is sufficient for this purpose.

The observation and recording of liquid-crystal chemigrams is accomplished during the flow exposure by means of optical devices.

Suitable indicator systems for making the flow visible are, according to the invention, acid-base indicators, such as phenolphthalein, thymol blue and other indicators or indicator mixtures, which are prepared by known methods or are commercially available. Furthermore, mixtures such as those used for pH measurements have been found to be particularly good, since they have a color spectrum full of nuances. This spectrum is traversed progressively from one extreme color to another during the flow exposure.

It has also been possible to obtain good recordings by the method of this invention with a four-component indicator according to Yamada, as described in J. chem. Educat. (1937), p. 275. This mixture produces chemigrams rich in color nuances and therefore furnishes highly differentiated flow images. It is therefore suited particularly for flow fields with areas of very different velocities.

The Universal Indicator Merck pH paper has also been found to be particularly well suited. This mixture is colored yellow-red for acid reagents and is suited particularly for the detection of turbulent boundary-layer flow. In other cases a two-component indicator for ultraviolet light was found to be particularly advantageous.

The pH indicators can be used with any direction of change desired. Hydrochloric-acid vapor has been found particularly well suited as an acid reagent, but other strong volatile acids can also be used, if they can be mixed well into the gas stream.

Carbon dioxide merits special interest as a noncorrosive, easily handled, inexpensive and readily available reagent. It can be taken from steel bottles or developed from dry ice. Because of the weak acidity, carbon dioxide requires special reactive layers which respond particularly to undiluted reagents. Of the acid-base indicators mentioned, thymol blue is suited particularly. Durable flow recordings can be obtained with hydrazine. Here, the shift of the Redox potential is made visible, for instance, by means of crystal purple. Recordings which regress after exposure to air, but are reversible, are obtained with the acid-base indicators whose transition interval is between a pH of about 10 and 7.2. These are, for example: thymol blue (whose second transition is obtained only by strong acids), a cresol red and phenolphthalein with color changes from blue via green to yellow, or red-purpose to yellow, as well as red through pink to colorless. These reactive layers record in about 30 seconds. The flow pattern image decays completely within about three minutes. With very good preparation, the time is just sufficient for photographing.

As an alkaline reagent, ammonia from a pressure bottle is suitable, or also a vapor such as that which escapes from its acqueous solution. It is less corrosive than hydrochloric acid. The volatile methyl amines, mono-, di- and tri-methyl amines, can also be used.

The development of the flow pattern takes several seconds to about five minutes and therefore proceeds rapidly and unequivocally. The time of the color reaction depends on the concentration of the reagent in the medium and, finally, on the state of development desired.

The indicator color for an acid reagent changes are as follows:

| | |
|---|---|
| YAMADA: | Green-yellow-orange-red |
| MERCK: | Blue green-green-ocher-yellow-red |
| Thymol blue: | Blue-green-yellow-red |
| UV light: | Green yellow-light blue |
| Crystal purple: | Colorless/light blue-blue ($CO_2$) |

The first two mixtures can be adjusted in themselves to blue by alkali. This color adjustment soon shifts under the influence of the carbon dioxide in the air toward to the green coloration mentioned. A particularly good record is obtained of the flow pattern by the addition of alkaline or acid buffer substances to the indicator mixture. For adjusting the basic color hue, a small amount of alkali or acid is often sufficient. Potassium or tetramethylammonium fluoride also buffers hydrochloric acid. Citric acid or sodium hydrogen sulfate buffers ammonia well.

Redox systems with the reagents ozone, oxygen, chlorine, bromine, nitrogen dioxide can be applied in interaction with reducing agents such as thiosulfate, sulfite and, for the reagents sulfur dioxide, hydrazine, hydroxylamine, in interaction with oxidants such as iron (III)-, manganese (IV)- or cerium (IV) salts. They must be indicated by means of an organic Redox indicator, such as ferroin.

Mixtures of cholesterinic liquid crystals are also suitable for flow indication according to the method of the present invention. A halogenated methane derivate can be used as the reagent. Suitable substances are commercially available pure and as a composition (for a given temperature range). In particular, chlorine and bromine methane, methylene chloride and chloroform are highly effective reagents. These vapors diffuse reversibly into the reactive layer. They change their phase state in the process and produce a color spectrum from colorless through red, yellow, green, blue, violet to colorless through refraction and circular polarization of the incident light. The boundary-layer flow field image is produced instantaneously and therefore offers the possibility to obtain a survey of the dynamic flow behavior as different boundary conditions are traversed. On the other hand, the observation of stationary flow conditions is possible only during the exposure.

Depending on the nature of the flow problem to be investigated, one or the other indicator system is advantageous for making the flow process visible. If the recording of stationary flow conditions, which is possible only by photographic means, is very difficult, or if the flow conditions of interest are already known, one would choose an acid-base indicator system, where one can work with a daylight or ultraviolet indicator. If a white contrast can be obtained easily, it is best to use the daylight acid-base indicators because they furnish an easily visible chemigram. If white contrast is not possible, dark contrast is chosen and is artificially enhanced, if necessary. The surface of the structural part is prepared with the reactive layer of the ultraviolet mixed indicator. If there is high corrosion sensitivity, carbon dioxide is chosen as the reagent.

The method of this invention can serve for rapid and simple checking in the aerodynamic design of moving and stationary bodies in equipment and machinery which are exposed to flow or generate flow, such as, vacuum cleaners, heater fans or blowers. One obtains chemical recordings regarding the patterns of the boundary-layer flow in the equipment being investigated. The engineering design of bodies which are exposed to flow or generate flow is thereby facilitated.

The invention will be explained more fully by means of the following examples relating to the preparation of indicator mixtures and the use of such indicator mixtures:

PREPARATION OF INDICATOR MIXTURES

Yamada Mixed Indicator 45 g of granular gelatine MERCK No. 4078 are dissolved in 450 g of water while stirring and heating in a water bath, and are mixed with 90 g of glycerin MERCK No. 4091. Then 1.6 g of 4-hydroxy benzoic acid methyl ester MERCK No. 6757 (preservative) is dissolved in a small amount of ethanol, and the solution is added to the gelatine sol. In about 200 ml of ethanol one now dissolves 100 mg thymol blue
250 mg methyl red
1200 mg bromine thymol blue, and 2000 mg phenophthalein,
and the basic color is adjusted for green-blue by means, for example, of a few centiliters of n/10 sodium hydroxide. Finally, the dye solution is stirred into the gelatine solution so slowly that no gelatine precipitates in the process.

Universal Indicator as per MERCK No. 9527

8 rolls of original Indicator Paper are bleached in 200 ml of lukewarm water in a 250-ml beaker. The decanted solution is evaporated to the limit of solubility, in order to obtain the highest possible area concentration of the indicator.

45 g of gelatine powder MERCK No. 4078 in 450 ml of the indicator concentrate thus obtained, are dissolved. Depending on the choice of the reagent, i.e., whether the development is carried out with hydrochloric acid or ammonia, the basic color of the indicator mixture is adjusted to blue-green with sodium hydroxide or to red with citric acid.

Ultraviolet Mixed Indicator 100 g of gelatine are dissolved in 400 g of water and are mixed with 560 g of glycerin. Then, 3 g of chinidinium chloride SCHUCHARDT No. CH 030 are dissolved in warm water, and separately, 5 g of dichlorfluorescin MERCK No. 9676, are dissolved in ethanol, and each is introduced into the gelatine sol. The mixture is fluorescent in the yellow-green base color and is ready for use with an acid reagent. During the chemical recording, the color turns to light-blue in ultraviolet light, while it remains unchanged in daylight.

Liquid-Crystal Indicators

| | |
|---|---|
| 3.0 g cholesteryl-oleate | RIEDEL 36301 |
| 0.8 g cholesteryl-pelargonate | RIEDEL 36302 |
| 0.5 g cholesteryl-benzoate | RIEDEL 36304 |
| 0.4 g cholesteryl-chloride | RIEDEL 36305 | are dissolved in about 100 ml of petroleum benzine, Kp 50° to 75°, MERCK 1773. The thermographic change is at 30° to 32°C. The solution is suitable for immersion as well as for spraying on.

INDICATORS FOR CARBON DIOXIDE

Crystal-Purple Indicator 1 g of granulated gelatine MERCK No. 4078 is dissolved in 10 g of glycol or glycerin at elevated temperature and under prolonged stirring. Then, about 100 mg of crystal purple are also dissolved and adjusted, after cooling, to the basic color, light-blue, by about 0.7 ml of hydrazine hydrate. The indicator mixture is always prepared fresh and protected from the air.

Methylviolet Indicator

This is prepared exactly like the crystal purple indicator and adjusted to a pale violet.

Thymol Blue Indicator

Into the water-free glycol or glycerin-gelatine solution described previously, 300 mg of thymol blue are stirred and dissolved. A few drops of concentrated sodium hydroxide are added and the base color is thereby adjusted to blue.

This mixture can also be used with a strong acid as the reagent and then indicates with a vivid contrast similar to the Universal Indicator by Merck. If one leaves the yellow basic color of the indicator, the mixture is ready for use with a basic reagent. Transition is from green to blue, reversible with ammonia.

Cresol Red Indicator

In the glycol or glycerin gelatin previously, about 5 mg of cresol red are dissolved. The basic color is adjusted to violet by means of concentrated sodium hydroxide.

Phenolphthalein Indicator

The glycol or glycerin gelatin described is mixed with about 100 mg of phenolphthalein and adjusted to the basic color red by adding about 15 mg of sodium hydroxide, dissolved in a little water.

Besides the indicators and indicator mixtures described, other indicator-dye mixtures can also be used for the method according to the invention, if they make differences of the flow behavior recognizable in a satisfactory manner.

EXAMPLES OF THE USE OF SUCH INDICATOR MIXTURES

Example 1

A glass plate 10 cm × 10 cm is coated with a reactive layer, about 0.1 mm thick, of the Yamada mixed indicator described previously. This can be done by painting it several times with a brush. After a gelling time of about 5 minutes, an air stream of about 3 l/min, to which 10 to 30-Torr HCl has been added, is blown over the plate at a glancing angle from a polypropylene nozzle of 2 mm inside diameter. With this reagent concentration a multi-colored jet cone, as shown in FIG. 1, is generated in about 5 sec of exposure.

Example 2

Figure 2:
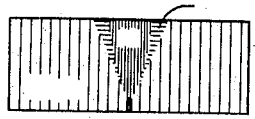
FIG. 2 is a boundary-layer flow image produced by the method disclosed in Example 2.

An anodized (eloxadized) A1 sheet of 21 cm × 35 cm is coated with a reactive layer of about 0.05 mm thickness of the MERCK Universal Indicator mixture described previously, with the addition of $3 \mu mol/cm^2$ of tetraethyl ammonium fluoride. Then the coating is dried slowly by covering up and a prepared surface with only little development of a drying ring at the edges is obtained. The metal sheet was cut into rectangles of 30 mm × 76 mm and serves for experiments on the influence of flow velocity and pressure, respectively. From a No. 14 injection needle an amount of 100 ml of air, mixed with 5 percent by volume of hydrochloric acid gas, is blown through a polypropylene nozzle over the length of the rectangle at a glancing angle. The initial exit velocity is about 16 m/sec. In about 5 seconds a red jet cone with yellow edges, as shown in FIG. 2, is produced.

Example 3

Figure 3:
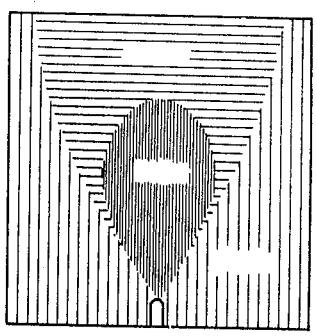
FIG. 3 is a boundary-layer flow image produced by the method disclosed in Example 3.

A wooden board of about 10 cm × 10 cm is painted black and the dried board is coated with the ultraviolet mixed indicator described previously in a thickness of about 0.2 mm. The layer dries in about 5 minutes and glows yellow-green under an ultraviolet lamp. From a polypropylene nozzle of 2 mm inside diameter an air stream of about 3 l/min, to which about 30-Torr HCl has been added, is blown over the plate. In about 10 seconds, an ultraviolet-blue jet cone as shown in FIG. 3, is generated.

Example 4

A glass plate of 10 cm × 10 cm is coated with an almost colorless reactive layer, about 0.1 mm thick, of the crystal-purple indicator described previously. After a gelling time of about 15 minutes, a carbon dioxide jet developed from dry ice is blown from the 2-mm diameter polypropylene nozzle over the layer at a glancing angle. The flow cone is indicated blue, somewhat more intensely at the core. The methylviolet indicator reacts in the same manner but with a violet hue. In air, the flow recording disappears in the increasingly blue background, but can be preserved longer without carbon dioxide.

Example 5

The same glass plate as used in Example 4 is coated with a blue reactive layer, about 0.1 mm thick, of the thymol blue indicator described previously. After a gelling time of about 15 minutes, a carbon dioxide jet developed from dry ice is blown from the 2-mm diameter polypropylene nozzle over the layer at a glancing angle. In about 15 seconds, the image of a yellow jet cone of, for instance, 3 cm length appears. At the same flow rate, the gas escapes from a No. 14 tubular needle several times faster and is visible as a yello-green cone, about 7 cm long, with a yellow core. The recordings disappear in air in about 2 minutes, as the base color reappears.

An air stream mixed with HCl is recorded in several colors with a red core and is permanent. If a reactive layer which has been left yellow is applied, then an air jet mixed with ammonia is recorded as green-blue. This coloring is reversible, like the one with carbon dioxide, and disappears in air.

Example 6

A glass plate like the one in Example 4 is coated with a violet reactive layer about 0.1 mm thick of the cresol-red indicator described previously. After a gelling time of about 15 minutes, a carbon dioxide jet is blown over the layer from a tubular needle at a glancing angle. The jet cone is recorded immediately with a yellow color. The boundary layer image disappears in about 1 minute after exposure and reappears after repeated action.

An air stream mixed with HCl is permanently recorded green and yellow with a red core.

Example 7

A glass plate as in Example 4 is coated with a red reactive layer about 0.1 mm thick of the phenolphthalein indicator described above. After a gelling time of about 15 minutes a carbon dioxide jet is blown from a tubular needle over the layer at a glancing angle. In about one minute a pink jet cone with a colorless core is recorded. The image disappears reversibly in about 2 minutes.

Example 8

Figure 4:
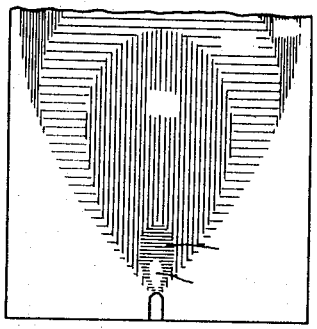
FIG. 4 is a boundary-layer flow image produced by the method disclosed in Example 8.

A plate of black polyethylene 10 cm × 20 cm is made insensitive against diffusion shifts of the thermographic transition interval by spraying on a black primer RIEDEL DE HAEN No. 36300, diluted 1 : 5 with water. The spraying on of a liquid-crystal reactive layer about 12 $\mu$m thick is controlled for high color brilliance through brief heating by means of a hot-air blower. Then, an air stream of about 3 l/min, to which 200-Torr chloroform vapor has been added, is blown over the plate at a glancing angle, as was described in Example 1. With good illumination, a boundary layer flow pattern image appears which is irridescent in the colors blue-green-red and the fluctuations of which mirror as to direction, intensity and color all changes of the air jet. A sketch showing this is reproduced in FIG. 4.

Example 9

Figure 5:
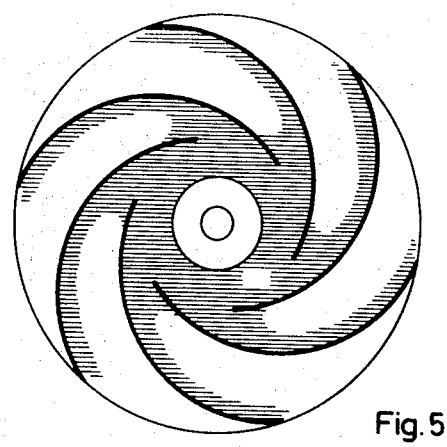
FIG. 5 is a boundary-layer flow image produced by the method disclosed in Example 9.

The rotor of a RAPID vacuum cleaner consists of a circular, 13-cm base plate and a cover plate with an intake opening of 5 cm diameter. Strips of aluminum sheet are riveted centrically about the center between the two plates as the blades and throw off the air radially. A vinylan foil is cemented to the base plate and is coated by means of an impregnated circular filter with Universal Indicator by MERCK. After reassembly and a drying time of 5 minutes, the full power at 220 V is switched on and the entering air stream is conducted over a glass dish filled with 32-% hydrochloric acid, where it is charged with 5 to 10 Torr of HCl. In about 30 seconds the chemically recorded image, shown in FIG. 5, of the air is produced which hits the base plate, flows preferably along the concave blades and is recorded in yellow green-red colors.

Example 10

The same rotors as described in Example 9 are dyed on the natural aluminum oxide skin with the MERCK Universal Indicator described previously. The exposure with 32-% hydrochloric acid is extended to about 5 minutes, until an image similar to that shown in FIG. 5 becomes visible.

Example 11

Figure 6:
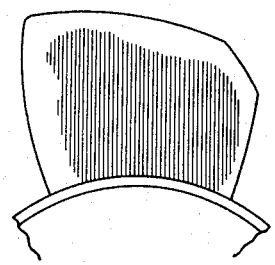
FIGS. 6 and 7 are boundary-layer flow images produced by the method disclosed in Example 11.
Figure 7:
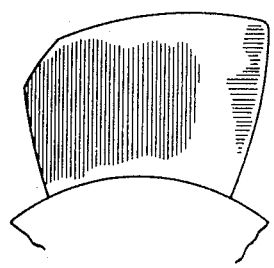

The horizontal and vertical, plane and curved interior surfaces of an automobile fan housing molded of black plastic and the five highly curved blades of its rotor are investigated with the MERCK indicator mixture described previously. For the propeller, the MERCK indicator gel and the fluorescent indicator gel proved useful. The blade surfaces very visibly change color from yellow to red and from green to blue, respectively, as shown in FIGS. 6 and 7.

Example 12

The housing of a RAPID kitchen beater is made of light-colored plastic and has only curved surfaces. The interior surfaces are prepared by painting or spraying with MERCK and YAMADA mixture described above. By chemical interval recording (2 to 3 seconds per step) a series of images are observed and photographed in color. Both reactive layers clearly indicate chemigraphically the main flow pattern. The propeller and two gears near the wall show zones of turbulence. The partition situated in front of the handle prevents flow through the handle and forces the cooling air to flow around to motor. Although this main flow is disturbed by the electric cable, it takes a path about the motor shaft. Part of the air also leaves at the opening for the stirrer chuck, while the main quantity escapes through the opening provided, which can be documented very well in the color photo.

Example 13

Three blower rotors with three curved, saddle-shaped blades of black plastic, with six similar blades and with ten straight blades of black-enamelled metal were coated with the mixed indicator for ultraviolet light described previously, for the purpose of recording the boundary layer flow. They were exposed, always at full motor power (220 V), to an air stream mixed with about 20-Torr HCl, and subsequently show in the dark, as observed under ultraviolet light (DESAGA lamp), color changes toward blue at various surface areas of the blades. The UV light chemigram could also be recorded by color photography with an exposure of several minutes.

Example 14

A wing profile and a cylinder, as known models in flow dynamics, were investigated in their projections on the plane. To this end the profile bodies were mixed vertically on a glass plate covered with a daylight indicator and the plate was suspended from the top in a standing open Plexiglass tube serving as a wind tunnel.

Figure 8:
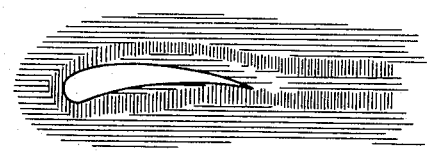
FIGS. 8, 9, and 10 are boundary-layer flow images produced by the methods disclosed in Example 14.
Figure 9:
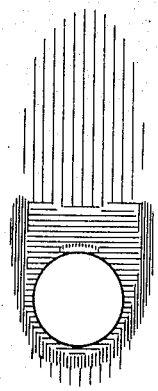
Figure 10:
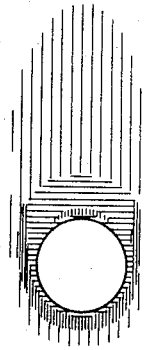

The blower is at the lower end of the tube. After switching the blower on, the exposure is begun by pushing a glass dish filled with 30 ml of reagent solution (36-% hydrochloric acid) under the intake opening of the tube. The boundary layer flow pattern is chemically recorded while being monitored visually. A sharply outlined flow pattern of the wing profile is obtained. A picture prepared with the Yamada mixed indicator is shown in FIG. 8. FIGS. 9 and 10 show pictures which were obtained with a flow-exposed cylinder at laminar flow of different quality with paper impregnated with MERCK indicator. In this manner the effect of a rectification grid can also be made clearly visible by means of chemical recording with the MERCK Universal Indicator. At first, the flow in FIG. 9 appears superimposed by a rotary motion and residual turbulence, while in FIG. 10 it is largely free of this as a result of the installation of the grid.

Example 15

The nature of the laminar flow in a 1-m long wind tunnel consisting of a Plexiglass tube of 14 cm diameter was investigated. This is accomplished by cementing-in a filter paper strip 15 to 20 cm wide which was impregnated with the MERCK indicator mixture described previously. The chemical recording takes place with hydrochloric vapor as described previously. The zone behind the blower is reddened most intensely in a non-uniform, cloudy manner. The cloud effect diminishes only slightly toward the exit. Intense reddening starts out from one edge of the paper and this indicates rotation of the streaming air. After installation of a rectification grid, consisting of Plexiglass tube sections of 16 mm diameter and length with rounded ends, the reddening is shortened to a short section (about 20 cm) behind the rectifier. The main length is colored almost uniformly orange-yellow and therefore indicates laminar flow. The settling of the air stream can further be seen from a glass plate coated with a reactive layer, which is suspended in the blower opening. Its front and side edges are now colored much more uniformly, but not yet symmetrically, as the chemical recording shows clearly. A distinct asymmetry also remains at the cylinder profile. By extending the wind tunnel to 2 m, the rotation is eliminated and the air flows around the cylinder in a very good laminar flow.

What is claimed is:

1. A method for making boundary-layer flow conditions of gases visible, comprising the steps of:
   a. applying at least one chemical color indicator in a thin reactive layer to the surface of a structural body to be exposed to the gas flow; and
   b. then subjecting the structural body to the gas flow for the purpose of producing a color reaction of the color indicator to the gas and thereby a visible boundary-layer flow image.

2. The method according to claim 1, and further comprising the additional step of recording the boundary-layer flow image after it has been made visible.

3. The method according to claim 1, and further comprising the additional step of photographing the boundary-flow image in color after it has been made visible.

4. The method according to claim 1 wherein the chemical color indicator is applied by binding it to a smooth absorbent paper and then applying the paper to the structural body.

5. The method according to claim 4 and further comprising the additional step of stripping said paper off the structural body after the structural body has been subjected to the gas flow and after a chemical color image of the boundary-layer flow has been produced on the paper, thereby providing a record of the flow on the paper.

6. The method according to claim 1 wherein the chemical color indicator applied is an acid-base indicator.

7. The method according to claim 6 and further comprising the additional steps of mixing a buffer with the acid-base indicator prior to applying the acid-base indicator to the structural body.

8. The method according to claim 6 and further comprising the additional step of mixing an alkaline buffer with the acid-base indicator prior to applying the acid-base indicator to the structural body.

9. The method according to claim 6 and further comprising the additional step of mixing an acid buffer with the acid-base indicator prior to applying the acid-base indicator to the structural body.

10. The method according to claim 1 wherein the chemical color indicator applied is a Redox indicator.

11. The method according to claim 1 wherein the chemical color indicator applied is a liquid-crystal indicator.

12. The method according to claim 11 wherein the liquid-crystal indicator is applied by spraying it on thinly in a low-boiling solvent whereby the solvent evaporates, leaving a dry film on the structural body.

13. The method according to claim 11 wherein the liquid-crystal indicator applied is a cholesterinic liquid.

14. The method according to claim 1 and further comprising the additional step of adding a reagent to the gas flow prior to subjecting the structural body to the gas flow.

15. The method according to claim 14 wherein the reagent is added in gaseous form to the gas flow.

16. The method according to claim 15 wherein the reagent is added to the gas flow by conducting the gas flow over the gaseous reagent.

17. The method according to claim 14 wherein the reagent is added to the gas flow by bubbling the gas flow through an aqueous solution of the reagent.

18. The method according to claim 1 wherein the chemical color indicator applied is applied in a moisture-retaining additive.

19. The method according to claim 1 wherein the chemical color indicator is applied in combination with a gelling agent and a moisture retainer.

20. The method according to claim 1 and further comprising the additional step of applying a foil to the structural body prior to subjecting the body to the gas flow.

21. The method according to claim 20 and further comprising the additional step of coating the foil with a binding agent prior to applying the foil to the body.

22. The method according to claim 1 and further comprising the additional step of applying a metal foil to the structural body prior to subjecting the body to the gas flow.

23. The method according to claim 1 and further comprising the additional step of applying a plastic foil to the structural body prior to subjecting the body to the gas flow.

* * * * *

UNITED STATES PATENT OFFICE
CERTIFICATE OF CORRECTION

Patent No. 3,787,874            Dated 1/22/1974

Inventor(s) Gerd Urban

It is certified that error appears in the above-identified patent and that said Letters Patent are hereby corrected as shown below:

In the Foreign Application Priority Data change the file number of the German application upon which the claim for priority is based from "Germany........2133865" to --Germany .........21 33 865.8--

In column 10, line 65, change "mixed" to --fixed--

In column 12, line 14 (claim 7), change "additional steps" to --additional step--

Signed and sealed this 9th day of July 1974.

(SEAL)
Attest:

McCOY M. GIBSON, JR.           C. MARSHALL DANN
Attesting Officer               Commissioner of Patents